United States Patent [19]

Bishop et al.

[11] Patent Number: 5,267,588
[45] Date of Patent: * Dec. 7, 1993

[54] ROTARY VALVE

[76] Inventors: Arthur E. Bishop, 19 Buffalo Road, Gladesville, N.S.W., Australia, 2111; Klaus J. Roeske, 54 Ponyarra Road, Beverly Hills, N.S.W., Australia, 2209

[ * ] Notice: The portion of the term of this patent subsequent to May 7, 2004 has been disclaimed.

[21] Appl. No.: 836,433

[22] Filed: Mar. 5, 1986

[30] Foreign Application Priority Data

Mar. 26, 1985 [AU] Australia ................................. 9908

[51] Int. Cl.$^5$ .............................................. F15B 13/04
[52] U.S. Cl. ............................ 137/625.23; 91/375 A; 137/625.24; 137/625.32
[58] Field of Search ..................... 137/625.24, 625.23, 137/625.22, 625.21, 625.28, 625.31, 625.32; 91/375 R, 375 A; 180/148, 132, 146

[56] References Cited

U.S. PATENT DOCUMENTS 4,540,024  9/1985  Bacardit ..................... 91/375 R X Primary Examiner—Gerald A. Michalsky

[57] ABSTRACT

A core for a rotary valve for a power steering system having in its periphery a plurality of blind ended longitudinally extending slots separated by lands for use in a sleeve member having in its bore a similar array of longitudinally extending blind ended slots matching those of the valve core but in an underlap relationship thereto, the slots of one being wider than the lands of the other so defining a set of longitudinally extending orifices which open and close when relative rotation in either direction from a neutral position occurs between the valve core and the sleeve in which at least two sets of valve core edges have along a substantial portion of their length a contour which extends substantially parallel to the core axis characterised in that the contour comprises in section a continuous curve wherein, at points near the high operating pressure zone thereof, it has a large radius of curvature and lies substantially parallel to the valve core periphery and wherein at a point along the curve approaching the coacting edge of an adjacent sleeve land edge when in the neutral position of the valve it lies at a steep slope to the valve core periphery with a curve of progressively smaller radius therebetween.

4 Claims, 4 Drawing Sheets

ROTARY VALVE

This invention relates to the cores of rotary valves of power steering gears, principally of the type wherein the valve core is also the input shaft to the steering gear.

Typically such a valve core has, in its outer periphery, a plurality of blind ended, longitudinally extending slots separated by lands. Journalled on the valve core is a sleeve member having in its bore a similar array of longitudinally extending blind ended slots matching those of the valve core, but in underlap relationship thereto, the slots of the one being wider than the lands of the other so defining a set of longitudinally extending orifices which open and close when relative rotation occurs between the valve core and the sleeve.

Drilled passages in the valve core and sleeve, together with circumferential grooves in the periphery of the sleeve, serve to communicate oil between the slots in the valve core and sleeve, an engine driven oil pump, and right-hand and left-hand hydraulic assist cylinder/chambers incorporated in the steering gear.

All of this is well known in the art of power steering gear design (for example as taught in U.S. Pat. 3,022,722) including the use of a torsion bar incorporated in the valve core which serves to bias the valve and sleeve towards a neutral on-center condition when no power assistance is required. When torque is applied by the driver to the steering wheel, the torsion bar deflects, causing relative rotation of the sleeve and valve core from the neutral condition, so directing oil to the right-hand and left-hand assist cylinders.

Such relative rotation of the valve elements will be directly proportional to the torque applied by the driver, so that if the edges of the slots are rectilinear, the area change of the aforesaid orifices will also be linear, and, as is well known in the art of such valves, the resulting pressure rise applied to the assist cylinders will be of an exponential form. The characteristic assist provided by such a valve will therefore be of a highly non-linear type. In constrast to this, the assist characteristic provided by the far more complex and formerly widely used hydraulic reaction power steering valve is truly linear over much of its operating range, as described in Automobiletechniche Zeitschrift 74(1972, page 62). A means of making the relatively simple torsion bar centered rotary valve simulate this aspect of the superior performance of the hydraulic reaction valve is described in U.S. Pat. No. 3,591,136.

According to that patent the edges of the valve core slots are substantially radial to the valve axis, but contoured along their length so that, upon relative rotation of the valve elements, shut-off occurs progressively along the valve. This progressive phase of shut-off is such that the rate of area change is exponential, so that the rise in oil pressure is directly proportional to valve rotation as the driver applies torque to the steering wheel, so causing the valve to simulate this aspect of the action of the hydraulic reaction valve. As shut-off is approached, and the valve is operating at near-maximum pressure, a short pocket of limited radial depth remains open to the flow of oil but closes rapidly on further rotation of the valve elements as in hydraulic reaction valves. Further important aspects of the hydraulic reaction valve, relating to the performance of the valve in the neutral or on-center driving region are imperfectly simulated in valves made according to that patent, as will be discussed later.

Valves conforming to U.S. Pat. No. 3,591,136 have been widely applied to integral steering gears for several years, but are proving unsatisfactory for use in the more recently preferred rack and pinion type power steering gears, due to the fact that valve metering of the type described in that patent tends to produce hissing noises when operating at other than low pressures. Rack and pinion steering gears are now often mounted directly to the engine compartment bulk-head, and such noises are therefore far more apparent to the driver as they are transmitted directly to the car interior.

It has been found that these noises can be greatly reduced if the design of the contour of the valve core slot edges is such that the oil flows in a thin 'sheet' or 'feather', which may be accomplished by having the edges of the valve core slots which operate at high pressures formed in such a manner that they are substantially of the same cross-section along their length, so producing a jet of oil, which is in the form of an elongated sheet a few micrometers thick. This is in contrast to the slot edge configuration shown in U.S. Pat. No. 3,591,136, which provides a short, thick jet of oil when the valve is operating at high pressures, only the short pocket referred to earlier remaining open. Examples of use of the 'sheet flow' hiss-suppressing technique are to be found in several Japanese manufactured steering gears, where the slot edges are each ground over their full length along the valve axis by causing a large cylindrical grinding wheel having its axis of rotation parallel to the valve core to grind one or more short flats on the slot edges almost tangential to the valve periphery.

Now, according to the present invention, in order to provide valve slot edges having an exponential rate of area cut-off and other geometric features which will be referred to later needed to simulate the hydraulic reaction type valves various specific proportions of the valve edges are required.

Firstly the cross-section of the slot edges of constant cross-section which are able to provide the exponential rate of area change has a scroll-like contour extending about 0.6 mm around the valve periphery, terminating, at the high pressure end thereof, in a surface nearly concentric with the valve axis.

At the low-pressure end of the contour corresponding to the position of the valve elements as they approach the on-center driving region, the slot edges become inclined at nearly 45° to the said surface. Secondly, in order to simulate the final rapid close-off characteristic of the hydraulic reaction valve, final close-off of the valve must occur rapidly, and hence the curvature of the contour at the high pressure end must reverse beyond that point where the rate of close-off has become substantially zero.

Preferred forms of valve core edges made according to the invention provide further refinements of hydraulic reaction valve performance relating to the operation of the valve in straight ahead driving. In this regime it is desirable that the steering gear operates substantially without any boost or assist, so that the self-aligning forces of the tires are not opposed by the steering gear, so ensuring that the driving 'feel' is retained. The hydraulic reaction valve is held inoperative in this regime so optimizing on-center 'feel'. In order that the torsion-bar-centered rotary valve simulate this characteristic, the orifice areas defined by the slot edges of the valve core and sleeve must be large when the valve is in the centered position so that initial rotation of the valve elements changes the area proportionally only a small amount. However, this means that a large amount of torsion bar deflection will occur before the pressure rises in the assist cylinders, and the steering gear will be very compliant and lack response in straight-ahead driving. This is in contrast to the sharp responses of the hydraulic reaction valve, which changes from the inoperative to operative mode upon very slight rotation of the valve elements.

In valve cores made according to preferred forms of the invention this defect of prior art valves is avoided by having the contour curve again, beyond the zone referred to where it approaches at 45° to the valve surface, to become concentric with the valve surface. Preferably, in this region just described, the contour has the appearance of an arc of a circle, subtending an angle of say 45°, having its center lying near the surface of the valve core adjacent the sleeve slot edge in the valve centered portion, but displaced into the underlapped zone. Beyond the point where the contour lies concentric to the valve core axis, it again curves towards the valve axis. It will be seen that this arrangement provides a 'hump' in the valve core edge contours which lie beneath the inner cylindrical surface of the sleeve and that the area defined by the gap between the sleeve and valve core does not change upon initial rotation of the valve elements from the centered position. This ensures that there will be no 'boost' or assist in the on-center driving mode. Upon slight further rotation, however, the contour just described provides a rapid commencement of boost as in hydraulic reaction valves.

Furthermore, by carefully proportioning the contour just described the orifice can be made to act when in the on-center driving regime as a venturi having a short zone of minimum cross-sectional area, bounded on each side by zones which gradually enlarge in sectional area, which arrangement produces far less pressure drop to fluid flow than a sharp-edged orifice having the same sectional area. This serves the purpose of reducing the back pressure of the valve and thus reducing the energy consumed by the power steering pump in this on-center driving regime, the predominant mode of steering operation. Note that this reduced back pressure is accomplished without employing excessive underlap referred to earlier as used by some prior art devices.

Thus it will be seen that, in preferred forms of the invention, a valve core slot edge takes the form of a smoothly changing contour having three points of inflection, the first referred to earlier in connection with the high pressure region, and an additional two points of inflection occurring in the low pressure on-center region. The latter two inflection points are such as to produce a venturi-like orifice with a zone of least sectional area on-center adjoined on each side thereof by zones of gradually enlarging sectional area. After some slight valve rotation the orifice closes rapidly.

A practical means of making this complex contour is set out in co-pending Australian Patent application numbered 7491/84 'Improved Means for Manufacturing Components of Rotary Valves'.

A typical valve made according to the foregoing description may have six slots in the sleeve and six slots in the valve core, all twelve edges of the valve core slots having the contour just described. (In some cases more or less sets of slots in the valve components may be used, but never less than two sets). These twelve edges will be connected in pairs via the drilled passages in the sleeve and valve core referred to earlier, to the pump inlet and return ports and to the assist cylinders, the first edges of each pair controlling the inlet of oil to the cylinders and the second edges of each pair controlling the exhaust from the cylinders to the return port. Thus all three sets of edges are acting in parallel at all times.

As is well known in the art, it is not necessary to contour all slot edges similarly, and valves are used where edges are of differing contour except as required for symmetrical operation of the steering gear.

For the valve core slot edge contours, which are the prime subject of this invention, such differences of contour from edge to edge or along their length will generally detract from optimum performance. However, the loss of performance may be acceptable if the optimum contour described above is used along a large part of the length of some of the slot edges, but never less than 2 sets (4 edges), with a non-preferred form used over the remaining edges or portion of the edges. Reducing the length of the preferred edge contour and using a non-preferred form over other parts of the total length reduces the demands on accuracy compared with the high pressure, feather orifice. The part or parts having a non-preferred form, may however, incorporate the venturi feature.

The present invention consists in a core for a rotary valve for a power steering system in which at least two sets of valve core edges have, along a substantial portion of their length, a contour which extends substantially parallel to the core axis characterised in that the contour comprises in section a continuous curve wherein, at points near the high operating pressure zone thereof, it has a large radius of curvature and lies substantially parallel to the valve core periphery and wherein at a point along the curve approaching the coacting edge of an adjacent sleeve land edge when in the neutral position of the valve it lies at a steep slope to the valve core periphery with a curve of progressively smaller radius therebetween.

In a preferred form of the invention the contour, in the direction towards the low pressure operating zone reverses in curvature so that the valve edge contour again approaches parallelism with the valve core periphery.

In a further preferred form said reversed curvature continues so that the valve contour again departs from parallelism so defining an orifice which, in the neutral position of the valve, has, for either direction of flow, a smoothly and continuously enlarging sectional area.

In order that the nature of the invention may be better understood a preferred form thereof is hereinafter described, by way of example, with reference to the accompanying drawings, in which.

Figure 6:
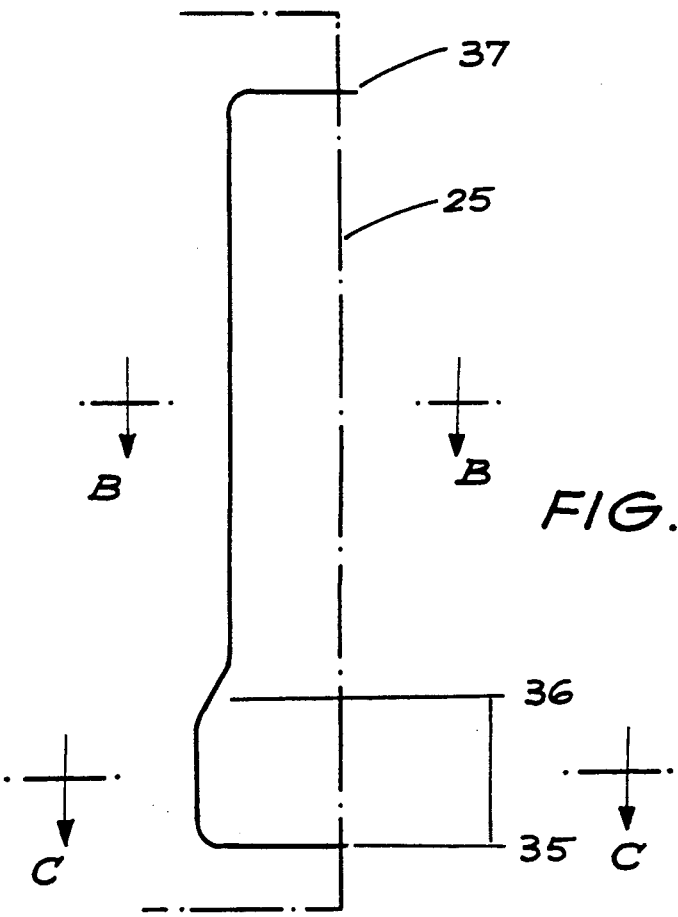
FIG. 6 is a view of one edge of a valve slot seen looking radially inwardly with the corresponding sleeve slot edge shown in chain lines.
Figure 6A:
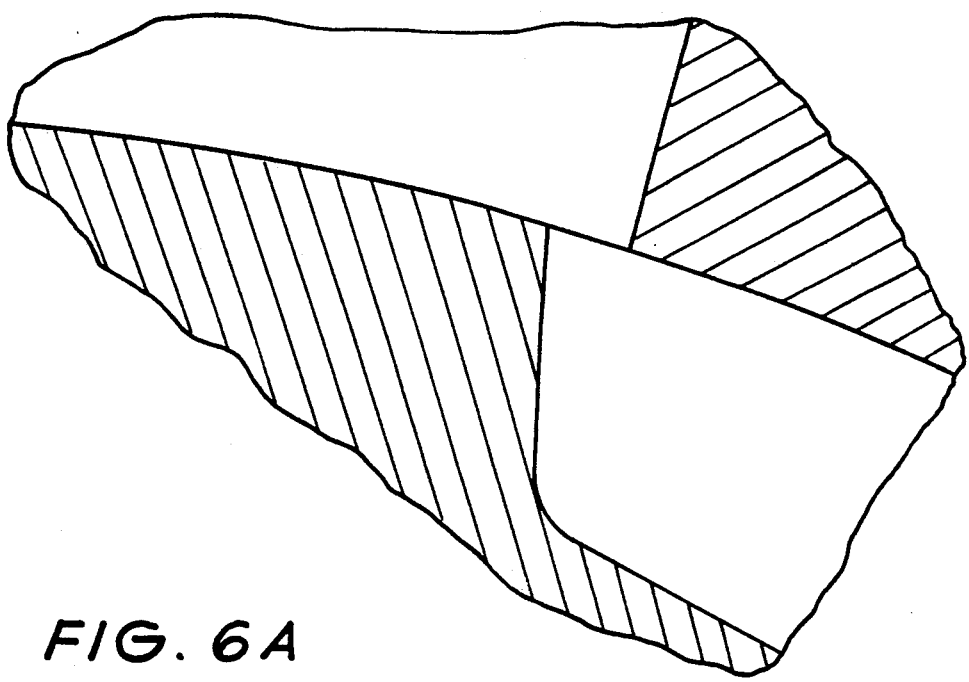
Figure 6B:
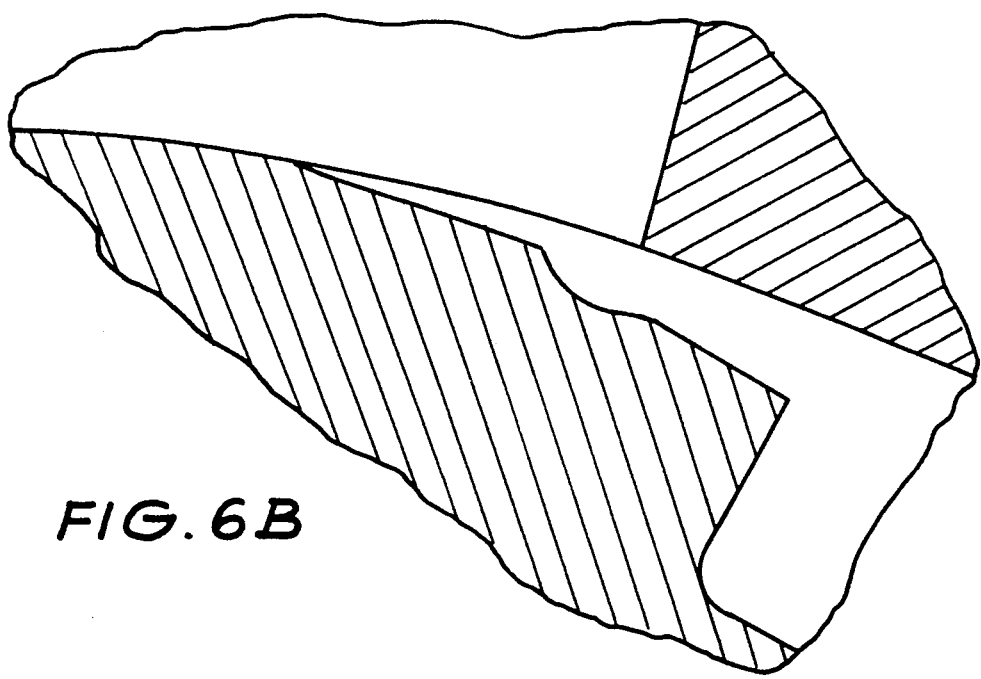

FIGS. 6a and 6b shown sections of FIG. 6 on lines B—B and C—C.

Figure 1:
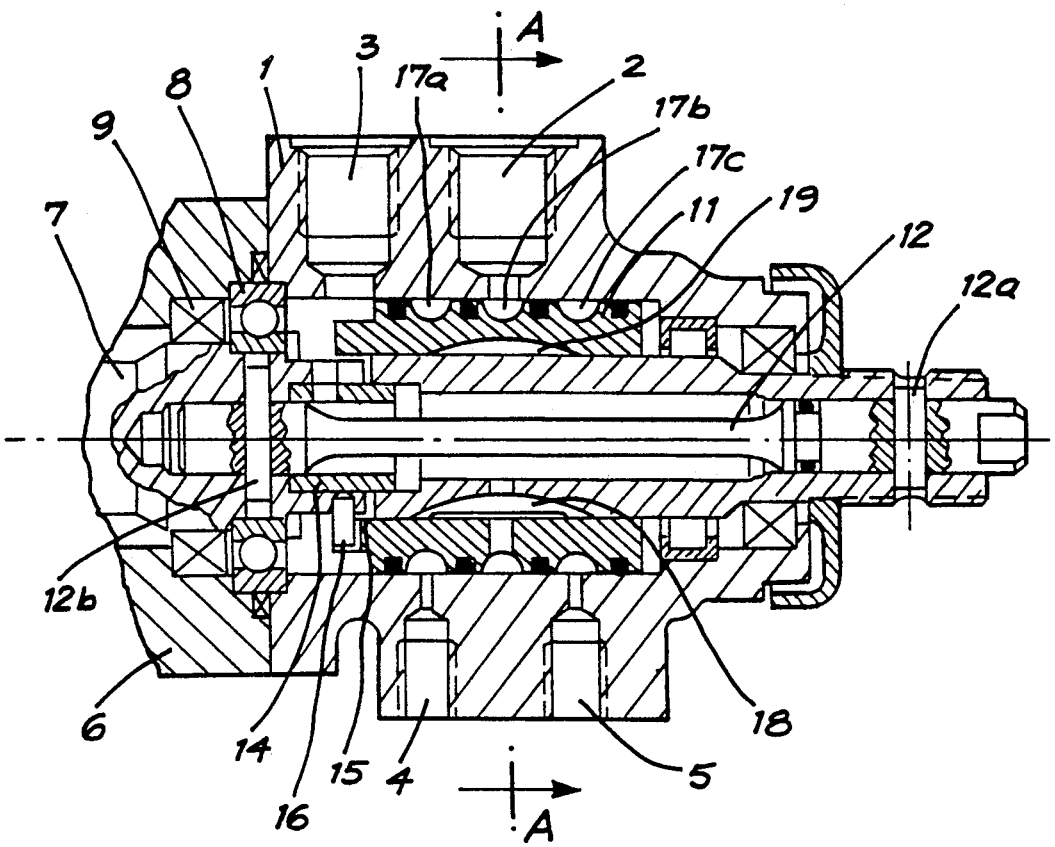
FIG. 1 is a longitudinal part-cross-sectional view of a rotary valve for a power steering system.

Referring to FIG. 1, valve housing 1 is provided with pump inlet and return connections 2 and 3 respectively and right and left hand cylinder connections 4 and 5. Steering gear housing 6, to which valve housing 1 is attached, contains the mechanical steering elements, for example, pinion 7, journalled by ball race 8 and provided with seal 9. The three main valve elements comprise valve core 10, sleeve member 11 journalled thereon, and torsion bar 12. This torsion bar is secured by a pin 12a to the valve core at one end similarly by pin 12b to pinion 7 at the other. It also provides a journal for valve core input shaft 10 by way of a bush as at 14. Sleeve member 11 has an annular extension having therein a slot 15 engaging pin 16 extending radially from pinion 7.

Figure 2:
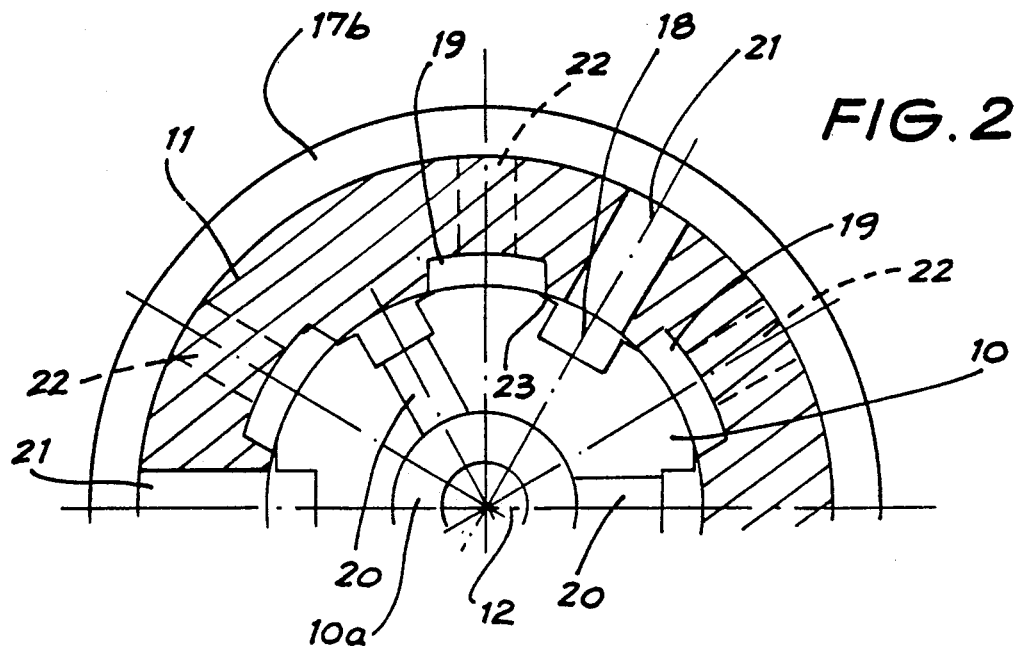
FIG. 2 is a cross-sectional view on line A—A of FIG. 1 of the valve core and surrounding sleeve in on-center condition.

Referring now to FIG. 2, valve core 10 and sleeve member 11 incorporate in their respective outer and inner mating surfaces a plurality of longitudinally extending, blind-ended slots 18 and 19 respectively. Sleeve 11 is also provided on its outer periphery with a series of axially spaced circumferential grooves 17a, 17b, 17c separated by seals. Radial holes 20 (FIG. 2) in valve core 10 connect alternate slots 18 to the center hole 10a in the valve core whence return oil can flow to pump return connection 3.

Radial holes 21 in valve sleeve 11 connect the remaining alternate slots 18 of the valve core to the center circumferential groove 17b and so to inlet port 2. Other slots 19 are connected by radial holes 22 to corresponding circumferential grooves 17a and 17c and so to cylinder ports 4 and 5.

In FIG. 2 it will be seen that, in the neutral, centered position of the valve there illustrated, the twelve longitudinal slots 18 and 19 of the valve core and sleeve respectively are so shaped as to provide twelve elongated orifices 23 which vary in area as relative rotation of the sleeve and valve core occurs.

The manner in which the valve operates to direct oil to and from the left and right cylinder ports 4 and 5 is well known in the art of such valves and the featuring of the edges of valve slot edges 18 to improve modulation of the valve is also a common practice.

Figure 3:
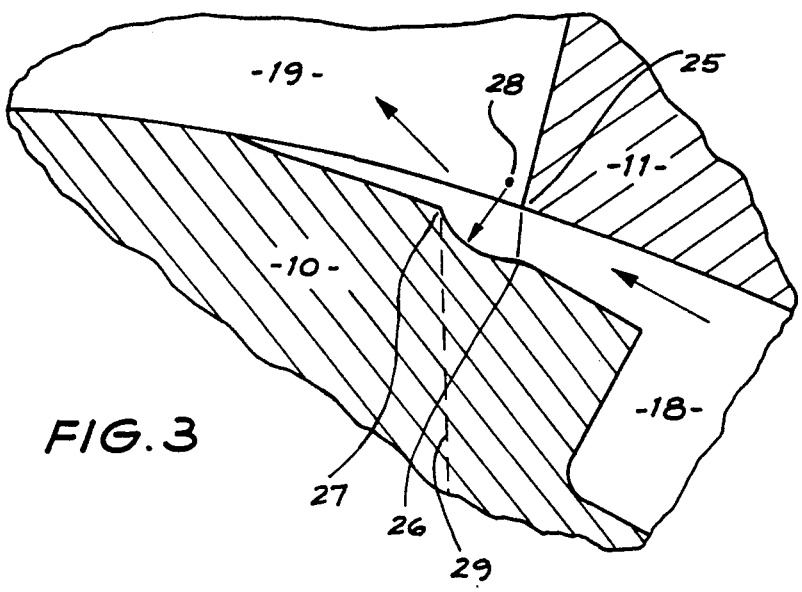
FIG. 3 is a cross-sectional view to an enlarged scale of portions of a valve core and sleeve incorporating the invention, constituting an orifice for the flow of oil the valve core being in the on-center or neutral position.

FIG. 3 shows in section to a greatly enlarged scale, the contour of one of the twelve orifices 23, (as for example, an inlet orifice to a left turn slot circles in FIG. 2), when the valve is in the centered condition.

Oil entering the orifice area from slot 18 encounters a smoothly narrowing orifice or throat having least sectional area at point 26 where valve sleeve edge 25 is closest to the adjoining featured slot edge of the valve core. Beyond this point and up to corner 27 the orifice smoothly enlarges in sectional area as the valve core slot edge is in the form of a radius about point 28 displaced to the left of sleeve slot edge 25.

This passage constitutes a venturi orifice, whose restriction to the flow of oil is far less than that of an orifice having a sharp corner as for example, had the valve core slot edge had the form shown by dotted line 29. Such a form of edge is typical of the ground valve edge referred to earlier.

Because the orifice is in the form of a venturi, the restriction to the flow of oil in the position shown is far less than that of the dotted line configuration notwithstanding that the distance 27-25 is greater than the distance 25-26. This is because, for a valve of the type indicated by line 29, flow separation occurs in 4 places—at both sides of corner 25 and at both sides of corner 27, whereas for the valve made according to the invention, separation occurs only to the left edge of corner 25 of the sleeve slot.

The pressure drop through the valve in the on-center or neutral position determines the energy consumed by the power steering pump in straight ahead high-speed driving, which of course, must be kept to a minimum value.

In, and adjacent to the on-center driving condition of the valve elements distance 25-26 remains constant and there is no change in restriction in any of the twelve orifices, and hence no pressure rise in the assist cylinders. Hence, in this low operating pressure zone, or region of operation, a condition of zero hydraulic assist is provided.

Upon sufficient counter-clockwise relative rotation of sleeve 11, point 27 will lie at the same distance from sleeve slot edge 25 as does point 26, and the venturi effect will cease. Additional rotation will cause a rapid reduction of orifice area, and thus a rapid rise in restriction to the flow of oil, and hence a rapid rise in pressure. Meantime the corresponding orifice on the opposite side of valve core slot 18 (not shown) provides a substantially unrestricted path to the flow of oil, now at an increased pressure, to the right-hand assist cylinder. Thus the design of orifice contour illustrated provides two important features of the hydraulic reaction valve, namely, zero on-center hydraulic assist and, thereafter, a rapid turn-around to a substantial degree of assist.

Figure 4:
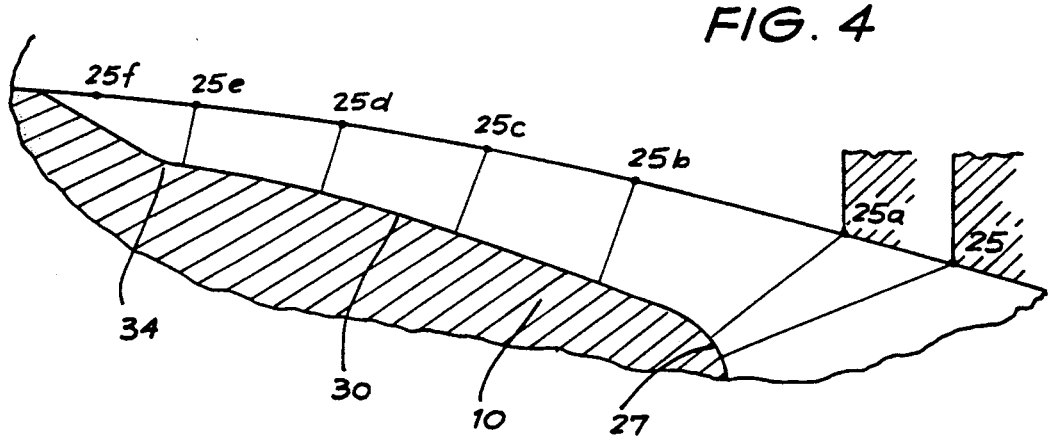
FIG 4 is a similar view to an enlarged scale of a portion of the orifice.

The valve core contour to the left of point 27 in FIG. 3, according to the preferred form of the invention, takes the form of an elongated scroll as shown in FIG. 4 this constitutes the high pressure zone of the orifice in that beyond point 27 in the direction away from the sleeve slot edge in FIG. 3 the distance between valve core contour at points such as 30 and 34 (FIG. 4) and the valve sleeve edge 25 is relatively small and the pressure correspondingly high.

The sleeve slot edge 25 corresponds to its position in the on-center condition illustrated in FIG. 3, and 25a its position when the distance 25-26 (FIG. 3) equals distance 25a-27.

Successive increments of movement of the sleeve groove edge 25a thereafter are shown as 25b- - - 25e, and it will be seen that the normal distance between these points decreases rapidly at first as for example at 25a, but finally slowly as at 25e where the contour 30 approaches parallelism with the valve core periphery, that is, concentricity with its axis.

The normal distances which occur at 25a- - - 25c decrease in an exponential manner in order that the pressure rise in this high operating pressure zone of the orifice is proportional to the relative angular displacement of sleeve 11 and valve core 10.

By this means a fixed ratio of assist is provided over and above some threshold value of relative rotation after point 25a is reached. Thus, in FIG. 5, P is the difference of pressure in the right and left cylinders, and α is the angular deflection of the torsion bar. Up to point 31a corresponding to sleeve slot edge position 25a there is substantially no rise in pressure P. Beyond this threshold value P rises proportionally to increase of α above point 31. In a typical valve core made according to the invention the rate at which edge 25 is approaching valve core surface decreases from a value of 170 μm/deg. for point 25b to a value of 15 μm/deg. for 25e, where it is almost concentric with the valve core surface.

Figure 5:
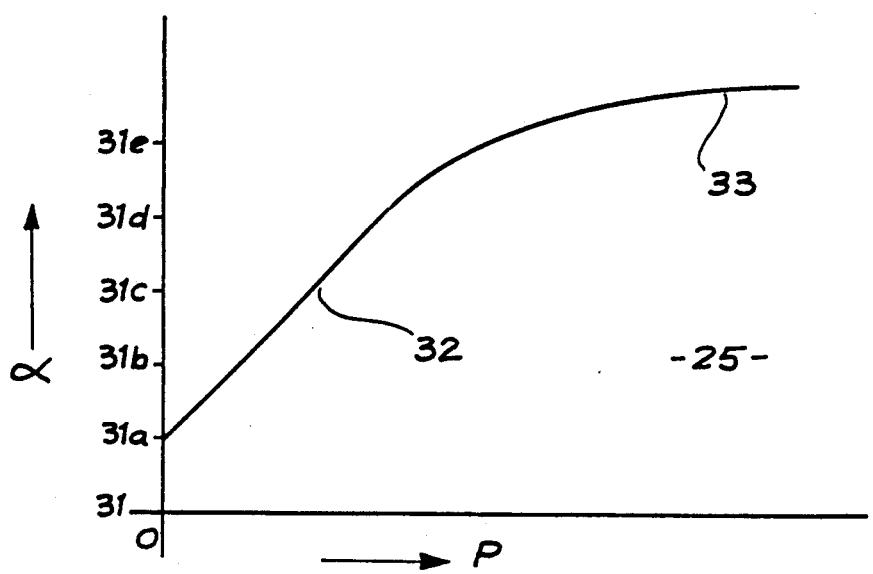
FIG. 5 is a curve showing the relationship between angular movement of the valve and the difference in oil pressure P between the left and right hand assist cylinders.

On further relative rotation of sleeve 11 such as occurs when 25 approaches 25f the normal distance between the sleeve edge 25 and the curve 30 of the valve core groove again decreases rapidly, so that the pressure again rises rapidly as at line 33 of FIG. 5.

It will be seen that, even when operating nearly closed as at 25d, the orifice comprises, at least to the right of that point, a smoothly enlarging orifice which tends to prevent flow separation and hence hissing noises within the valve attributable to cavitation.

In FIG. 6 a non-preferred embodiment is shown in which the mode of operation of the valve just described applies only to that portion along the length of the valve contour between points 35 and 36 housing a section as shown in FIG. 6B. Thereafter, between points 36 and 37, the section is as shown in FIG. 6A.

We claim:

1. A generally cylindrical core for a rotary valve for a power steering system having a mating cylindrical sleeve with at least two inwardly facing lands extending axially in cooperation with respective axially extending slots in said core, and wherein fluid in each slot is at a lower operating pressure when the lands are centered over respective slots constituting the neutral position of the valve and reaches a high operating pressure when the lands are rotated relative to the slots away from centered condition toward one of the edges of the respective slot, and wherein at least two sets of valve core slot edges have, along a substantial portion of their length, a contour which extends substantially parallel to the core axis characterised in that the contour comprises in section a continuous curve wherein, at points near the high operating pressure position thereof, it has a large radius of curvature and lies substantially parallel to the valve core periphery and wherein at a point along the curve approaching the coacting edge of an adjacent sleeve land edge when in the neutral position of the valve it lies at a steep slope to the valve core periphery and a curve of progressively smaller radius therebetween.

2. A core for a rotary valve as claimed in claim 1, wherein the contour in the direction towards the low operating pressure position reverses in curvature so that the valve edge contour again approaches parallelism with the valve core periphery.

3. A core for a rotary valve as claimed in claim 2, wherein the valve contour again departs from parallelism so defining an orifice which in the neutral position of the valve has, for either direction of flow, a smoothly and continuously enlarging sectional area.

4. A core for a rotary valve as claimed in claim 1, wherein the contour at points beyond the said points near the high operating pressure position converges on the valve core periphery.

* * * * *